United States Patent

Di Marco et al.

[11] Patent Number: 6,119,529
[45] Date of Patent: *Sep. 19, 2000

[54] FLUID FLOW METER AND CORRESPONDING FLOW MEASURING METHODS

[75] Inventors: Francesco Di Marco, Mascalucia; Matteo Lo Presti, Misterbianco; Salvatore Graziani, Catania; Salvatore Baglio, Paterno, all of Italy

[73] Assignee: SGS-Thomson Microelectronics S.r.l., Agrate Brianza, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/978,335
[22] Filed: Nov. 25, 1997

[30] Foreign Application Priority Data

Nov. 28, 1996 [IT] Italy ................. MI96A02489

[51] Int. Cl.[7] .................. G01F 1/46; G01F 1/68
[52] U.S. Cl. ...................... 73/861.68; 73/204.27
[58] Field of Search .............. 73/204.11, 204.14, 73/204.25, 204.27, 861.68

[56] References Cited

U.S. PATENT DOCUMENTS

| 5,311,762 | 5/1994 | Drexel | 73/204.14 |
| 5,390,541 | 2/1995 | Feller | 73/204.14 |
| 5,544,079 | 8/1996 | Saikalis | 73/204.14 |
| 5,553,505 | 9/1996 | Bignell et al. | 73/204.14 |
| 5,595,163 | 1/1997 | Nogi et al. | 73/204.27 |
| 5,764,539 | 6/1998 | Rani | 73/204.11 |

*Primary Examiner*—Harshad Patel
*Attorney, Agent, or Firm*—Theodore E. Galanthay; Allen, Dyer, Doppelt, Milbrath & Gilchrist, P.A.

[57] ABSTRACT

A fluid flow meter is of the type including a heated probe sensor of known electric resistance dipped into or swept by a fluid stream having a predetermined velocity. The sensor is capable of converting each flow velocity value to a voltage value, and is connected to a processor operating using fuzzy logic for producing the flow measurements. The sensor may be an NTC thermistor. The thermistor may be powered from a current generator, and the processor may include a neural network. The sensor may include at least two discrete thermistors, one being a hot thermistor and the other being a cold thermistor.

13 Claims, 8 Drawing Sheets

FIG. 1.
(PRIOR ART)

FLOAT-TYPE FLOW METER

FIG. 2.
(PRIOR ART)

$$\frac{\Delta f}{f} = \frac{2\nu}{\alpha}$$

VOLTAGE VALUES ACROSS AN NTC THROUGH WHICH A CURRENT IS FLOWED AT DIFFERENT FLOW TEMPERATURES $T_f$

GRAPH SHOWING THE TRUE FLOW VALUE
(SMOOTH LINE CURVE) AND THE VALUE
IDENTIFIED BY THE NETWORK (UNEVEN LINE CURVE)

FLUID FLOW METER AND CORRESPONDING FLOW MEASURING METHODS

FIELD OF THE INVENTION

This invention relates to the field of fluid flow, and more particularly, to a fluid flow meter and corresponding flow measuring method.

BACKGROUND OF THE INVENTION

As is known, matter in a fluid, liquid or gaseous, state is vitally important to the biosphere as well as to human activities. For instance, for societies whose economy is based primarily on agriculture and/or cattle breeding, an abundance of water may be a primary consideration among the factors that ensure development and prosperity. On the other hand, in industrial societies, a number of other fluids, besides water, are critical to the fostering of development.

Of major concern are the problems of tracing such fluids, processing and dispensing them to millions of users. Closely related to such problems is also the manner in which the mass, volume and flow rate of the fluids are measured. A range of different systems for measuring the flow rate and velocity of a stream of fluid have been produced through the years. But the systems currently available on the market have evolved in view of industrial applications, and their cost is often high enough to forbid their adoption for domestic applications on any large scale.

The flow measuring systems proposed by the state of the art are based on different physical principles, and vary according to the kind of fluid to be measured for velocity. In all cases, the measuring systems currently available on the market are relatively expensive, and in general, have shapes and dimensions that make them impractical to merchandise in large volumes for domestic applications.

Briefly reviewed herein below are some of the conventional techniques employed for measuring the velocity or the flow rate of fluids.

1) Pitot Tube.

A Pitot tube allows the velocity head v of a fluid flow of known direction to be measured by taking pressure measurements at two points in a conduit of suitable shape.

The velocity head v of the flow is obtained from the following relationship:

$$v = \sqrt{\frac{2(p_{stat} - p_{stag})}{\rho}}$$

where:

V is the flow velocity, [m/s];

$\rho$ is the mass density of the fluid, [kg/m$^3$];

$P_{stag}$ is the stagnation pressure, [Pa]; and $P_{stat}$ is the static pressure, [Pa].

Therefore, once the density P of the fluid and the pressure differential between a stagnation pressure $P_{stag}$ and a static pressure $P_{stat}$ are known, the velocity v can be calculated. However, the measurement of the pressure differential is often affected by various sources of errors. In particular, the static pressure is difficult to measure accurately for the following reasons:

a misalignment between the velocity vector and the tube axis (whereby the static pressure measurement can be biased by pressure components due to velocity);

a diameter dimension of the tube altering the normal fluid flow; the stream lines near the tube surface are indeed longer than those in the undisturbed region, resulting in increased velocity and, hence, decreased static pressure;

the influence of the supporting tube on the stagnation pressure; and viscosity exerting an additional force on the stagnation cavity, so that a higher stagnation pressure is produced than anticipated.

2) Laser-Doppler Speed Meter.

This device employs a laser light beam focused onto a point where the flow velocity is to be measured, and a photodetector to detect the diffused light from suspended foreign particles to be found naturally in unstrained fluids. The velocity of the particles, assumed to be the same as that of the fluid, causes a frequency variation in the diffused light which is tied to the fluid's own velocity. The flow velocity can be obtained by measuring this variation.

Major advantages of this device are that no physical objects need be introduced into the flow; accordingly, the fluid's own motion will be unperturbed; a fairly high frequency response can be obtained; and the volume required for carrying out the measurement can be fairly small.

On the other hand, the device also has disadvantages, as follows: transparent channels must be used; tracing particles must be provided within the fluid, unless they occur naturally in the fluid; and the equipment cost and complexity are considerable.

3) Restriction-Flow Flowmeter.

The most widely accepted principle used in the design of flow meters of this type is that of creating a restriction of predetermined cross-sectional area within the tube wherethrough the fluid is to run. This restriction causes a pressure drop which is dependent on the flow velocity. From a measurement of this pressure drop—to be taken on a suitable differential pressure pickup, for example—the flow rate q and flow velocity can be arrived at, according to the following relation:

$$= \frac{A_{1f'}}{\sqrt{1 - \left(\frac{A_{2f}}{A_{1f}}\right)}} * \sqrt{\frac{2(p_1 - p_2)}{\rho}}$$

where:

$A_{1f}$ and $A_{2f}$ are the areas where the pressures $p_1$ and $p_2$ are respectively measured, [m$^2$];

$\rho$ is the mass density of the fluid, [kg/m$^3$]; and $p_1$ and $p_2$ are the static pressures as measured at points in the conduit having the cross-sectional areas $A_{1f}$ and $A_{2f}$, respectively, [Pa].

The advantages of these devices reside in their simple construction and low cost.

For practical use, the above relation should include correction factors. For example, $A_{1f}$ and $A_{2f}$ would not be the true areas corresponding to the diameters of the tube and the restriction, respectively, but rather the actual cross-sectional areas of the fluid flow. In real situations, effects due to friction are also present which lead to a loss of pressure head and errors in the pressure drop readings.

As follows from the above relation, a variation in the pressure differential by a ratio of 10:1 corresponds to a variation in the flow velocity by a ratio of 3:1. Since the meters used for measuring pressure differentials are wholly inaccurate at less than 10 percent of their full-scale value, this non-linearity, which is typical of all restriction meters, limits the flow measuring to within a range where the ratio of the maximum and minimum measurable values is 3:1.

4) Float-Type Flowmeter.

This is a useful instrument widely accepted for small and very small flow rates, where most of the other devices would be ineffective. It comprises a slightly conical tube containing a small ball or body of revolution, called the float although it would sink in the fluid being measured.

Figure 1:
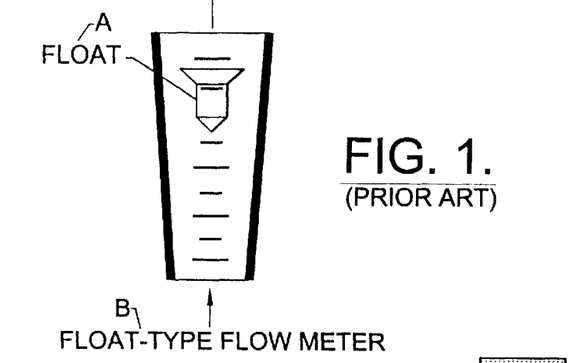
FIGS. 1 to 4 are respective schematic views of flowmeters according to conventional principles and techniques of the prior art.

The tube is mounted vertically with its large base facing upwards. The fluid is admitted from underneath and lifts up the float until the free area between the float and the tube becomes such as to exactly meter the rate of flow to be measured across it, at a predetermined pressure drop almost entirely dependent on the ratio of the float weight (neglecting buoyancy) to the maximum cross-sectional area of the float. The height reached by the float is read directly on a scale, where the tube is transparent, or is measured by means of linkages or magnetic pickups where the tube is made of metal. This measuring step is illustrated by the schematic of accompanying FIG. 1.

Since the free area is, as a first approximation, proportional to the height attained by the float, and flow rate itself is proportional to the free area, the relation between flow rate and float lift is near-linear.

5) Rotor Counter.

The sensing element of this type of meter is an axial vane rotor driven rotatively by the fluid to be measured. The rotor flow-rate meter is extensively employed with fluids which have inherent lubricanting properties, such as hydrocarbons, so that frictional losses from the rotary gearing can be kept low.

The rotor bearings are here the most critical components, and require periodical replacement. The rotation is almost invariably measured by means of an inductive or capacitive type of proximity sensor which generates an electric pulse each time that a vane moves past a detection point. Good linearity and repeatability are advantages of this device. Major disadvantages are a high cost, mechanical fragility, and extensive maintenance requirements.

6) Measuring-Chamber Displacement Counter.

This is strictly a displacement meter. A volume of fluid, called the cyclic volume, is caused to flow at each cycle from inlet to outlet through constant volume moving chambers, or chambers which are alternately filled and emptied.

The fluid motion therethrough drives an output shaft rotatively. The power required for driving the mechanical members is sometimes provided by the fluid itself. The constructional and functional problems posed by these meters are those of tightness and wear. Accuracy is, in fact, affected therein by dimensional variations and fluid leakages that change with pressure and viscosity. In addition, the manufacturing cost of such meters is quite high.

7) Whirlpool Meter.

This device operates on the principle of detecting oscillatory phenomena artfully induced in the fluid. It comprises a barrel section accommodating a crosswise-laid body (C) which is shaped to produce in its wake a series of eddies which separate periodically and alternately to one side and the other. The pitch or distance between two successive eddies is, for a given size of the barrel, proportional to the mean velocity and flow rate of the fluid. The output signal can be produced from a shaped body caused to oscillate by the eddying action. The amplitude of the oscillation provides a measure of the flow velocity. Since the measurable flow rate is tied to the occurrence of eddies and the minimum detectable amplitude of the signal, the read range of such meters is rather narrow.

8) Drag Flowmeter.

Figure 2:
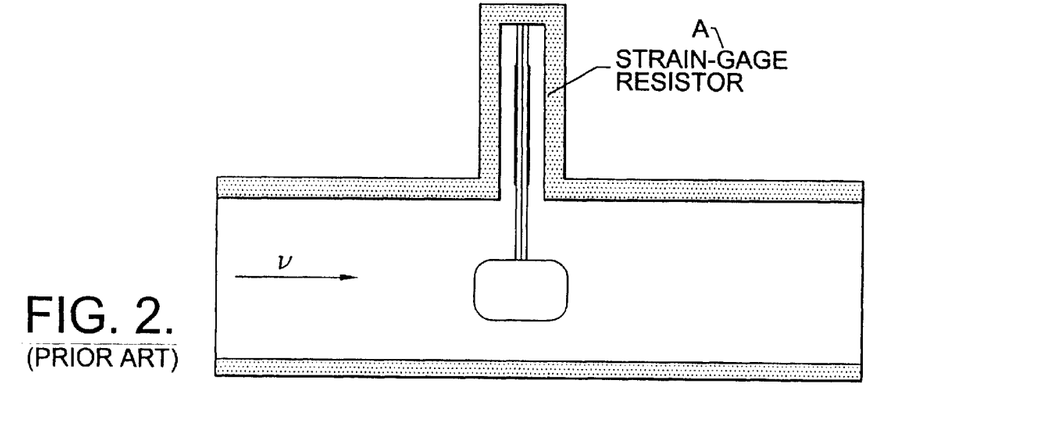

The principle used by this meter is that of measuring the drag Fd of a body immersed in the fluid, as shown schematically in FIG. 2. This drag, to be measured by means of strain gage resistors suitably mounted to the stem that holds the submerged body, is tied to the flow velocity by the following relation:

$$Fd = \frac{C d A \rho v^2}{2}$$

where:

$C_d$ is the drag coefficient (non-dimensional);

A is the conduit cross-section. [$m^2$];

$\rho$ is the mass density of the fluid, [$kg/m^3$]; and v is the velocity of the fluid, [m/s].

9) Electromagnetic Flowmeter.

This meter principle is based on Faradays law, whereby between the ends of conductor of length dl in motion at a speed v inside a magnetic field with induction B, an electromotive force is developed as given by:

$$d e = v \wedge B * d 1$$

This law applies equally to conductors in the solid, liquid and gaseous state. Accordingly, if a magnetic field is created in a transverse direction along a pipe section wherethrough the fluid is being assed, the affected fluid will become the site of an electric field. A difference of potential is measured, between two electrodes placed within the field along an orthogonal diameter to the field, which is related to the flow velocity and flow rate.

In practical situations, the magnetic field has a limited extent, so that no voltage is induced in parts outside it; such parts will rather act as a short circuit reducing the voltage drop. This effect can be attenuated by increasing the extent of the magnetic field; for example, a length of three times the tube diameter is adequate. These meters can also be operated with slightly conductive liquids.

10) Ultrasonic Flowmeter.

This meter is characterized by excellent repeatability and linearity, as well as by its capability to measure flows in either directions and, within limits, even pulsating flow rates. In addition, some of these meters can take the measurement from outside the conduit, out of contact with the fluid; in no way do they significantly restrict the flow cross-section. They operate on either of at least two principles.

A first principle is based on Doppler's Effect. An emitter of ultrasound radiates ultrasonic waves at a given frequency f through a fluid containing tiny particles or bubbles suspended in a parallel direction to the flow direction. These particles being in motion, they will reflect part of the sound wave at a slightly lower frequency, when detected by a fixed receiver. Calling "a" the speed of sound through the fluid, and "v" the mean velocity of the reflective particles (v<<a), the frequency abatement of the reflected wave is:

$$\Delta f / f = 2 \ v / a$$

A major drawback of this method is the dependence of the output signal on the speed of sound through the medium, and therefore on the nature and physical state of the liquid.

Figure 3:
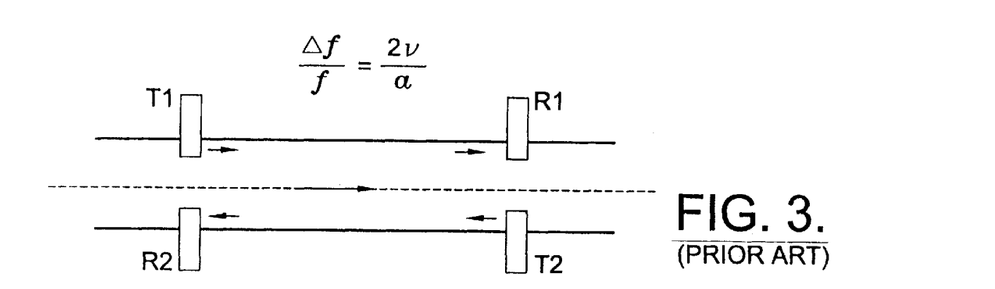

The second principle is illustrated schematically in FIG. 3, and is based on that the speed of the ultrasonic wave is added vectorially to that of the fluid medium through which it propagates. Shown in FIG. 3 are two pairs of transmitters T1, T2 and receivers R1, R2. The signal emitted from the first transmitter T1 will propagate to the receiver R1 at an absolute speed (a+v), and the signal from the second transmitter T2 at an absolute speed (a−v). Thus, the fluid velocity can be obtained by measuring the distance between the transmitters and the receivers and the difference between the propagation times of the ultrasonic signal in either directions. It can be shown that the output signal is unrelated to the speed of sound through the medium.

11) Heated Probe (Hot-Wire) Anemometer.

This anemometer operates on the principle of subtracting heat from thin wires by forced convection.

Figure 4:
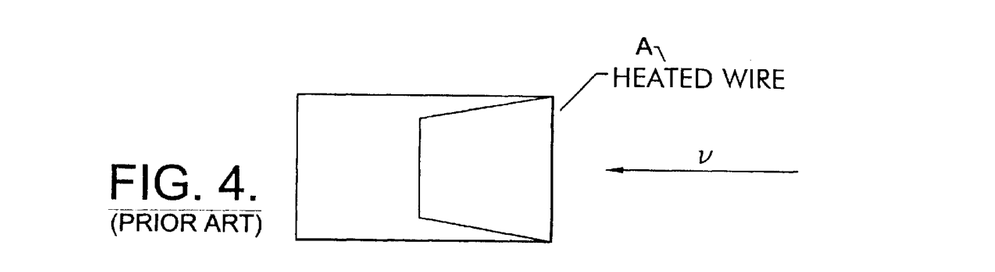

Illustrative of the type is the hot-wire anemometer, which comprises a platinum or tungsten wire having a diameter in the 5 to 50 $\mu$m range and length of a few millimeters, its ends being soldered to two parallel needles. FIG. 4 shows schematically an example of this device.

A current I is flowed through the wire, whose resistance R is dependent on temperature. A power $p=RI^2$ is produced by Joule's Effect, and the wire is heated. The wire is then swept orthogonally by a fluid stream having a velocity v and a set of different parameters. The thermal energy balance for the probe is given by:

$$dU = Eg - Es$$

where:

dU is the energy variation internally of the probe per unit time, [W];

Eg is the thermal energy generated within the probe per unit time, [W];

Es is the thermal energy exchanged between the hot wire and the fluid per unit time, [W].

Substituting the probe own quantities for the terms, then:

$$\rho C V dT_s/dt = RI^2 - hA(T_s - T_f)$$

where:

$\rho$ is the mass density of the probe, [kg/m$^3$];

C is the thermal capacity of the probe, [m$^2$/s$^{2\circ}$ K.];

V is the volume of the probe, [m$^3$];

A is the surface area of the probe, [m$^2$];

R is the electric resistance of the probe, h is a heat exchange coefficient (forced convection coefficient), [kg/s$^{3\circ}$ K.];

$T_s$ is the probe temperature, [° K.];

$T_f$ is the fluid temperature, [° K.].

In steady conditions ($dT_s/dt=0$), the thermal power delivered to the probe and that removed from it equal each other, so that:

$$RI^2 = hA(T_s - T_f)$$

The heat exchange coefficient h is a function of a set of parameters of the fluid, including viscosity, conductivity, thermal capacity, velocity v, temperature $T_f$, and of the surface thermal conductance of the probe. However, for a field of temperature differentials ($T_s-T_f$) within a given range and velocities between a few decimeters per second (below which, natural convection would prevail) and a few decameters per second, the parameter may be approximated as follows:

$$h = a + b\sqrt{v}$$

with the terms a and b being constant within the above range. Thus:

$$RI^2 = (a + bA_{2f}\sqrt{v})A(T_s - T_f)$$

and:

$$RI = (a + b\sqrt{v})A(T_s - T_f)/I$$

With the current held constant, the velocity V of the fluid can be obtained from a voltage measurement across the heated probe, since all the terms of the equation are known, excepting v.

Unfortunately, this meter requires frequent re-calibration, even at intervals of a few hours, because the exposed wire is readily contaminated. For improved repeatability, screened wire or coated probes are used, wherein the wire is covered with a thin layer of quartz. These will obviously be sluggish in picking up viscosity, conductivity and thermal capacity variations of the fluid, since the heat exchange coefficient "h" is dependent on these quantities.

SUMMARY OF THE INVENTION

It is an object of the present invention to provide a fluid flow measuring method and meter which afford uniquely simple functional and structural features to enable the manufacturing of inexpensive meters of fluid velocity, and therefore flow rate, and for use inside constant cross-section conduits.

The present invention measures a fluid velocity, or fluid flow inside constant cross-section conduits, using sensors in the same class as heated probe sensors but of low cost, such as NTC (Negative Temperature Coefficient) thermistors, to provide information that is then processed by a fuzzy mathematical model of the meter. However, any other heat sensing method could be used. Based on the invention, the technical problems of the prior art are solved by a meter as indicated being characterized in that the sensor is capable of converting each velocity value from the sensor to a voltage value, and is connected to a processor operated on fuzzy logic for providing the flow measurement.

The present invention also measures a fluid flow, wherein a thermistor is used for a sensor to convert each value of flow velocity to a voltage value, and a processor operated on fuzzy logic is connected to the thermistor for providing the flow measurement.

More particularly, and unlike current heated probe flowmeters which are constructionally simple but significantly affected by changes in the temperature of the flow being measured, the meter of this invention can measure any flows whose temperatures vary within a predetermined range.

Advantageously, the meter of this invention can measure a flow rate, e.g. of air, even where a set of limitations are imposed on it by the quantity to be measured, the output signal, and the degree of accuracy sought. In addition, the meter of this invention, formed of inexpensive components on account of the neuro-fuzzy techniques adopted, can be small in size and relatively low cost.

The features and advantages of the measuring method and the meter according to the invention will be apparent from the following description of an embodiment thereof, given by way of illustrative and non-limitative example with reference to the figures of the accompanying drawings.

DETAILED DESCRIPTION

Figure 5:
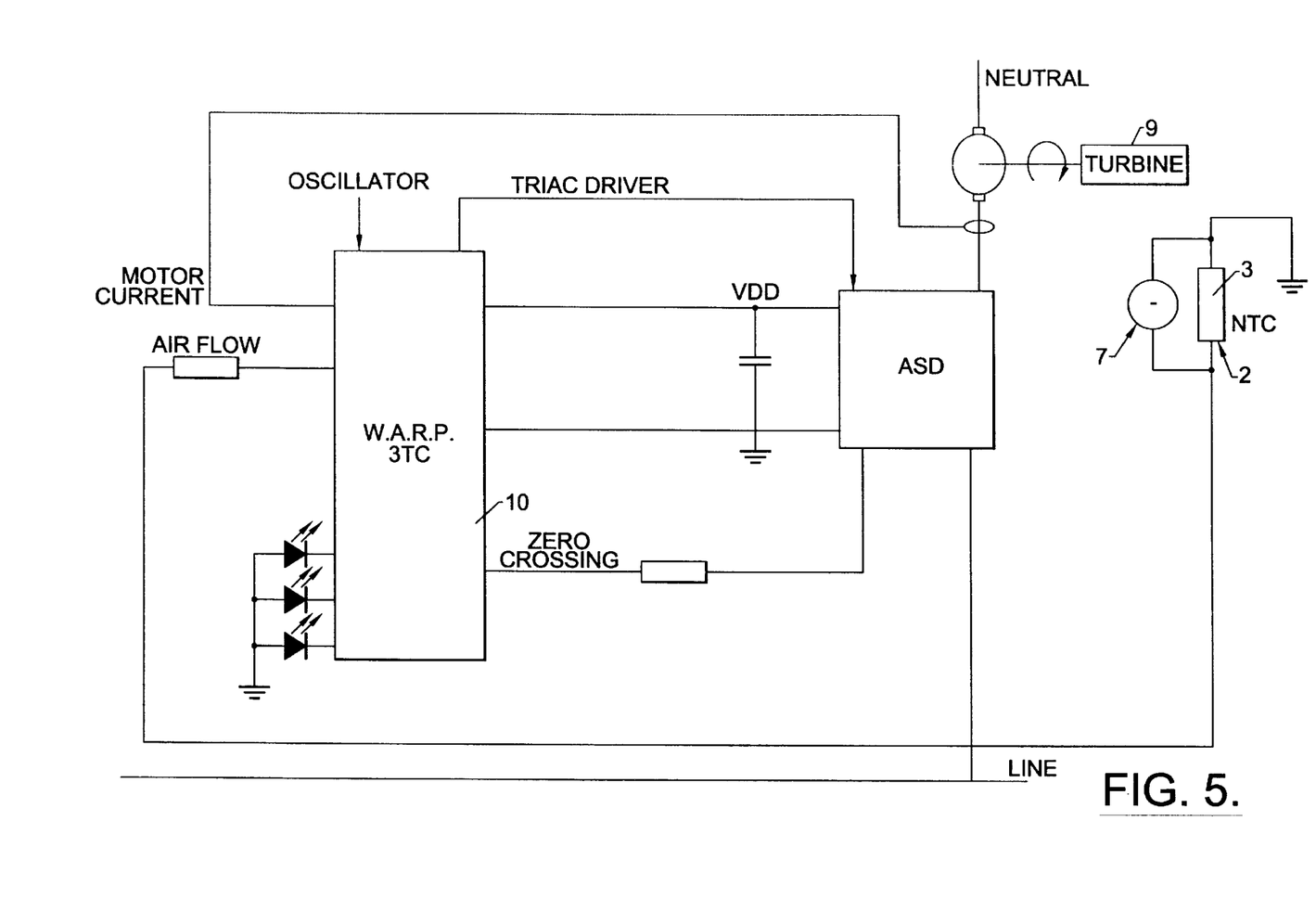
FIG. 5 shows schematically a flowmeter according to the invention and illustratively intended, for use in a suction hood.

Referring in particular to the example of FIG. 5, generally and schematically shown at 1 is a flowmeter according to this invention. The meter 1 is of the constantly heated probe type. Advantageously in this invention, a thermistor 3 of the NTC (Negative Temperature Coefficient) type is used as the probe 2, which combines a comparatively low cost with good stability and robustness.

Figure 6:
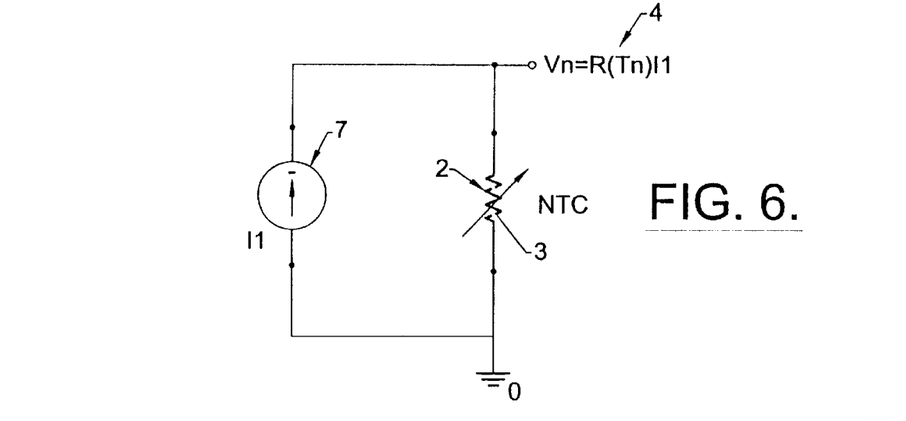
FIG. 6 is a schematic view of a sensor incorporated into the meter of FIG. 5.

The thermistor 3 is incorporated to a circuit 4, a schematic whereof is shown in FIG. 6. As can be seen in FIG. 6, a generator of a constant current I1 powers the thermistor 3 between a first reference supply voltage Vn and a second voltage reference which may be a ground GND. The thermistor 3 is placed inside a pipe, not shown because conventional, itself accommodated within a suction hood. The hood may be a household kitchen hood or any dust exhausting hood. In FIG. 5, the hood is schematically represented by an impeller 9. Advantageously in this invention, the thermistor 3 is connected to a fuzzy logic processor 10 and adapted to provide a measurement of a fluid flow, as explained hereinafter.

Figure 7:
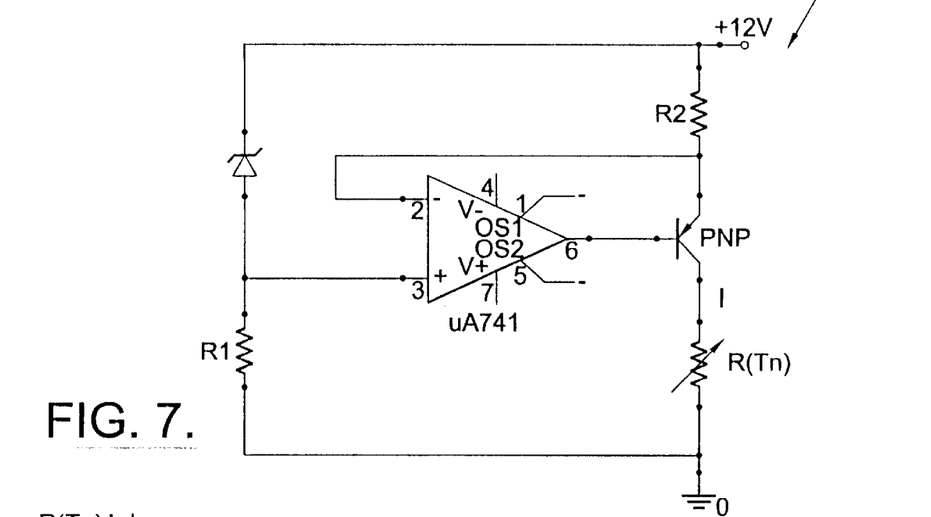
FIG. 7 is a schematic detail view of the sensor in FIG. 6.

For completeness'sake, FIG. 7 shows in further detail the construction of the constant current generator 7. Preferably, it comprises a PNP bipolar transistor, being connected in series with resistors between the power supply Vn and the ground GND and having a control terminal driven by a differential amplifier of the A741 type. One input of the amplifier is fed back through the emitter terminal of the PNP transistor.

The current I1 is passed through the thermistor 3, whereby the latter becomes heated by Joule's Effect. A thermal balance equation for the NTC thermistor 3, having a current I of 100 mA, for example, passed therethrough and being swept by an airflow with velocity v, can be written as follows:

$$R(T_n)I^2 = hA(T_n - T_f) + \rho C V d\, T_n/dt$$

where:

$R(T_n)$ is the resistance of the NTC thermistor at a temperature $T_n$, $[\Omega]$;

I is the current through the NTC thermistor 3, [A];

h is a thermal coefficient, [kg/s$^{3\circ}$ K.], which can, under normal operation conditions, be approximated as $$h = a + b\sqrt{v}$$

A is the surface area of the NTC thermistor, [m$^2$];

$T_n$ is the temperature of the NTC thermistor, [° K.];

$T_f$ is the fluid temperature, [° K.];

$\rho$ is the mass density of the NTC thermistor, [kg/m$^3$];

C is the thermal capacity of the NTC thermistor, [m$^3$/s$^2$ ° K.[ ]; and

V is the volume of the NTC thermistor, [m$^3$].

Assuming steady conditions whereby $dT_n/dt=0$ and choosing for the heat exchange coefficient "h" an applicable approximation to the normal operation condition, the heat exchange equation becomes:

$$R(T_n)I^2 = \left(a + bA_{2f}\sqrt{v}\right)a(T_n - T_f) \tag{1}$$

and therefore:

$$R(T_n)I = \left(a + b\sqrt{v}\right)a(T_n - T_f)/I \tag{2}$$

Taking now $T_f$=const., a relation is arrived at between the voltage $V=R(T_n)I$ across the NTC thermistor (with $T_n$ being tied to $R(T_n)$ by the relation $R(T_n)=R(T_f)\exp b(1/T_n - 1/T_f)$) and the fluid velocity v.

Thus, the fluid flow can be readily obtained from a measurement of the voltage V across the thermistor 3. Since the temperature $T_n$ of the thermistor does not vary much with a varying flow velocity, the variation to be obtained in the quantity $(T_n - T_f)$ can be regarded as trivial compared to the variation undergone by the term $$+b\sqrt{v}$$

Therefore, the above equation may be rewritten in the following form:

$$R(T_n)I = K_1 A\left(a + b\sqrt{v}\right)$$

where, $k_1 = (T_n - T_f)/I$.

Figure 8:
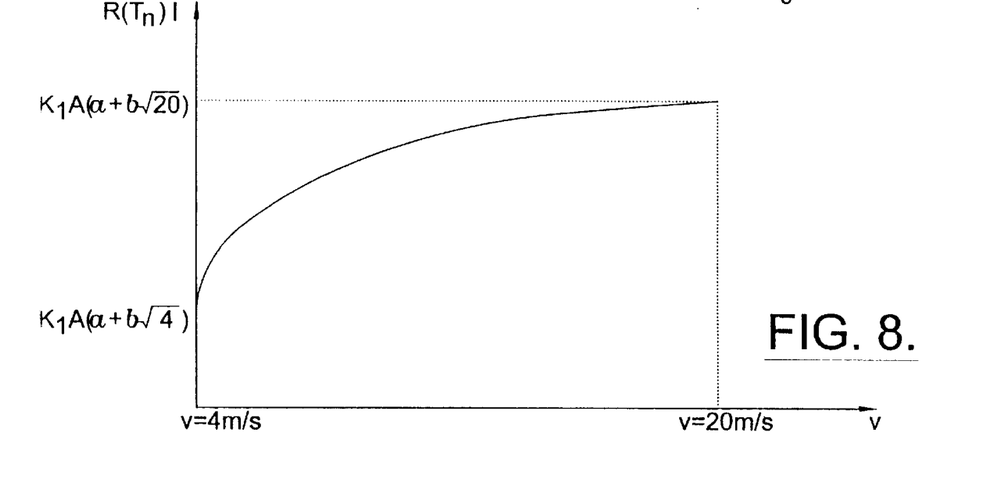
FIG. 8 is a plot of voltage versus fluid velocity as provided by the sensor of FIG. 6.
Figure 9:
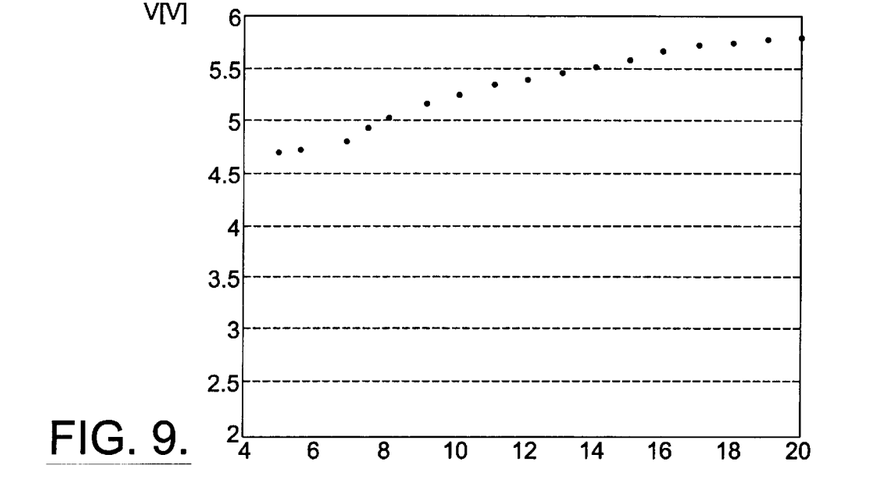
FIG. 9 shows discrete plots of the voltage values appearing in FIG. 8.

Plotting the theoretical values for the voltage $V = R(T_n)I$ across the thermistor 3 versus the flow velocity v, the curve shown in FIG. 8 is obtained. As can be seen, the curve shown in FIG. 8 is a segment of a parabola. FIG. 9 shows instead discrete voltage values as measured across the NTC thermistor 3 at predetermined flow velocities.

Figure 10:
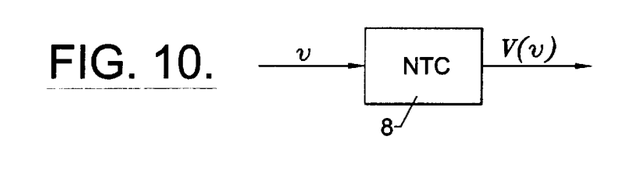
FIG. 10 is a schematic detail view in block form of the sensor of FIG. 6.

The circuit of FIG. 6 can be represented schematically by a simple block 8, shown in FIG. 10. The block 8 represents an NTC thermistor which is essentially adapted to convert a flow velocity input value v to an output voltage value V. The voltage V is the voltage present across the NTC thermistor according to the fluid flow velocity It has been assumed in the foregoing that the fluid temperature $T_f$ were constant, but this assumption appears now too restrictive.

As follows readily from the previous equations, even a small change in the fluid temperature $T_f$ can result in a variation of the voltage V across the NTC thermistor which is larger than that to be caused by a change in the flow, for a given percent variation. In fact, the voltage is tied to the temperature $T_f$ by a linear relation (with values of flow temperature and velocity above unity).

Assuming constant flow (v=const.) conditions and a varying flow temperature $T_f$, and $T_n$=const., equation (2) becomes:

$$R(T_n)I = K_4(T_n - T_f)$$

where:

$$K_4 = \left(a + b\frac{\sqrt{v}}{I}\right) = Const.$$

Figure 11:
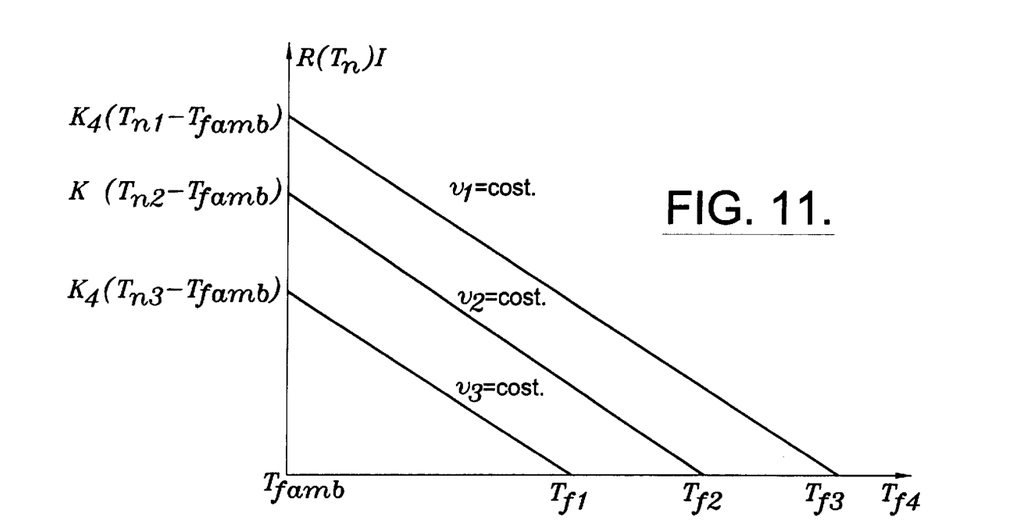
FIG. 11 is a graph of the voltage across a component of the sensor in FIG. 6 under three different conditions of a flow being measured at constant velocity and varying temperature.

Plotted on a graph in FIG. 11 is the theoretical pattern of the voltage V across the NTC thermistor under three distinct flow conditions designated $v_1, v_2, v_3$ for which the temperature $T_f$ varies. It should be noted that the terms $T_{n1}, T_{n2}, T_{n3}$ are different temperatures acquired by the NTC thermistor at flows having velocity values of $v=v_1$, $v=v_2>v_1$, $v=v_3>v_2$, respectively.

Figure 12:
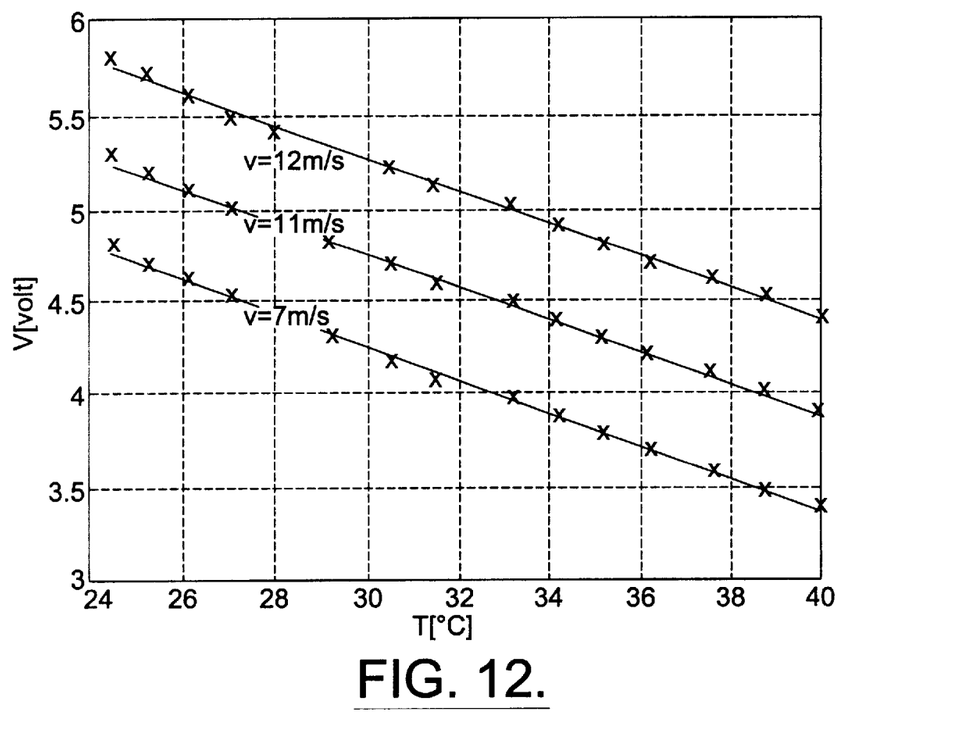
FIG. 12 is a plot of values of true voltages when measured at constant flow and varying temperature.

Shown in FIG. 12 are true values of the voltage V, i.e. values measured at selected times across the NTC thermistor under conditions of flow measurement at constant velocity v, and temperature $T_f$ varying within the range [25° C., 40° C.]. On the other hand, as follows from FIGS. 11 and 12, the fluid temperature $T_f$ alters appreciably the relation between the voltage across the NTC thermistor and the fluid velocity v. By altering this relation, the fluid temperature acts as a quantity of influence.

Figure 13:
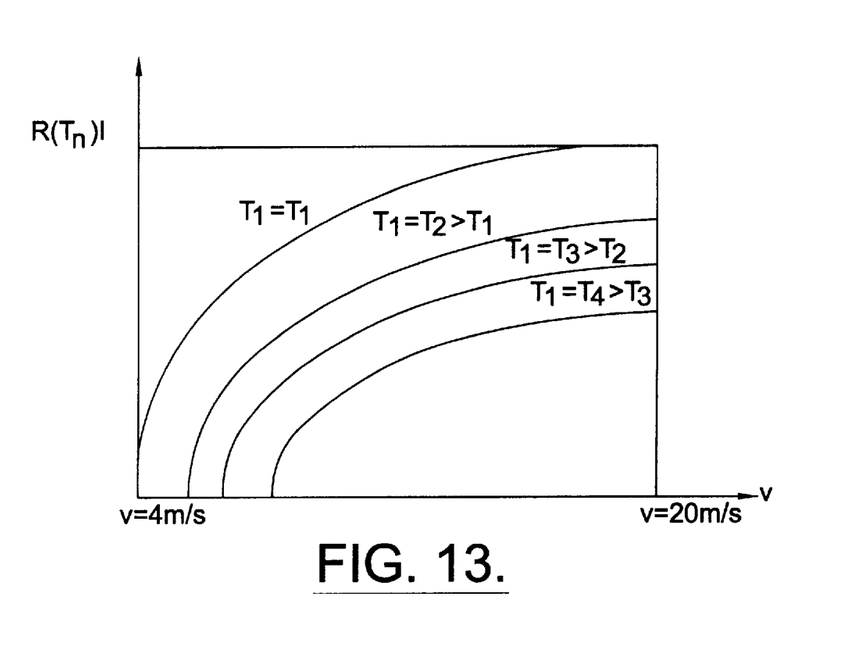
FIG. 13 is a graph illustrating the behavior of voltage across a component of the sensor in FIG. 6 versus flow velocity under different temperature conditions.

FIG. 13 is a graph illustrating the theoretical pattern of the voltage across the NTC thermistor with respect to the flow velocity v, at different temperatures $T_f$ of the fluid.

Figure 14:
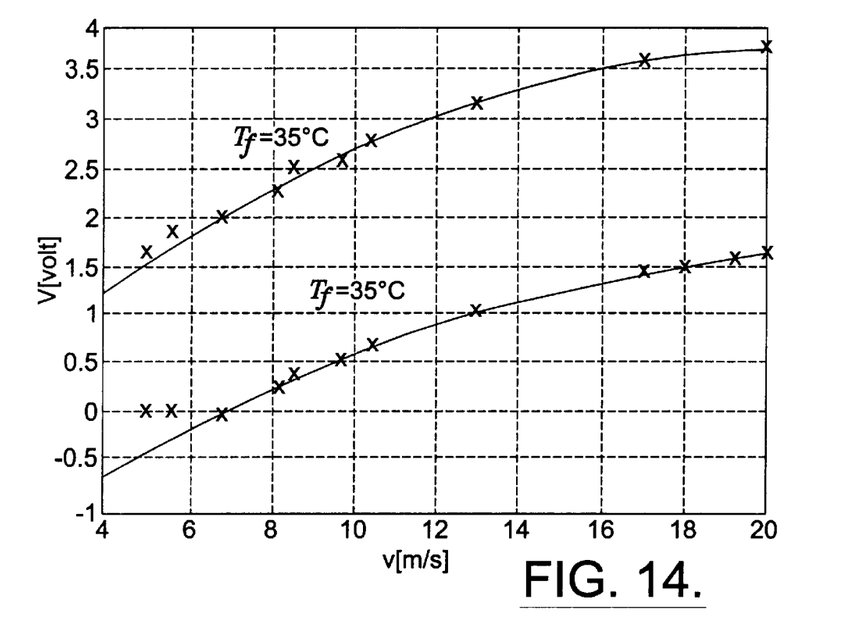
FIG. 14 illustrates the behavior of true voltages across a component of the sensor in FIG. 6 versus flow velocity under different temperature conditions.

The anticipated theoretical values are confirmed by the ideal values (full line curves) and by the true ones plotted in FIG. 14 illustrating the voltage pattern for two sequences of flow values, the one at a temperature of 25° C. and the other of 35° C. It is therefore apparent that the increase in temperature of the fluid $T_f$ causes the values of the voltages $V_0$ to shift at the output of the circuit 8. Thus, the fluid temperature $T_f$ is indeed the main quantity of influence on the NTC thermistor.

Reverting now to the thermal balance equation (1) for a thermistor through which a current of value I is passed, and which is dipped into a fluid with velocity v, under steady conditions, it will be:

$$R(T_n)I^2 = hA(T_n - T_f)$$

Assuming a small value for the current I, i.e. a value that would cause the thermistor to operate within the low current range (e.g., I=30 mA), the first term of the equation may be neglected ($R(T_n)I^2 \approx 0$), so that:

$$\left(a + b\sqrt{v}\right)A(T_n - T_f) = 0$$

and therefore:

$$T_n = T_f$$

Accordingly, under such conditions, the NTC thermistor attains a temperature $T_n$ which is independent of the fluid velocity but is coincident with its temperature. The approximation made in analytical terms is confirmed by experimental data obtained with the measurements shown in FIG. 15.

Figure 15:
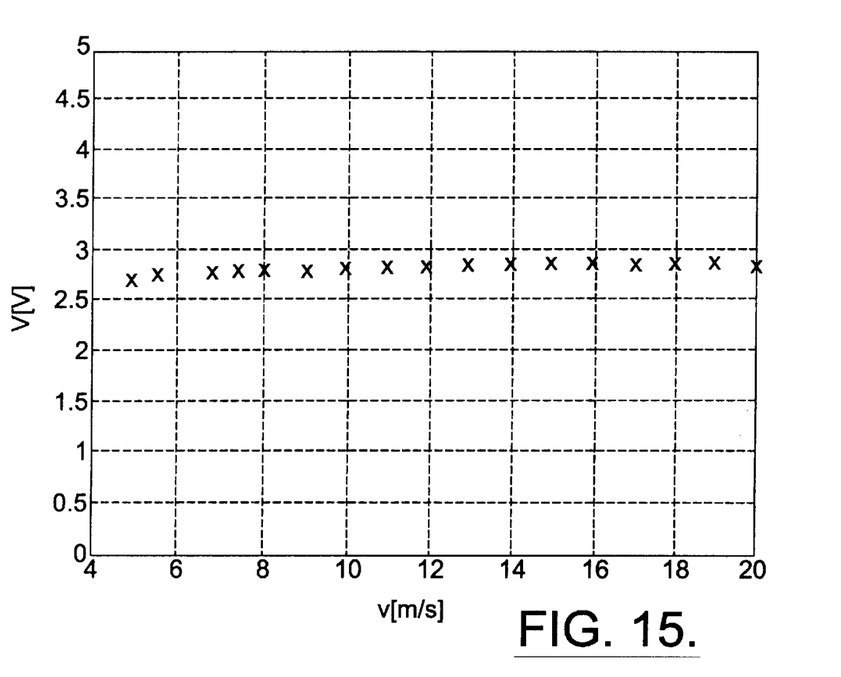
FIG. 15 is a plot of true voltages across a component of the sensor in FIG. 6 when a small current is passed therethrough at predetermined flow values.

Shown in FIG. 15 are voltage values across an NTC thermistor through which a small value current is passed at predetermined flow values. As can be seen, this voltage V does not vary much with the flow velocity; rather, it is near constant.

Figure 16:
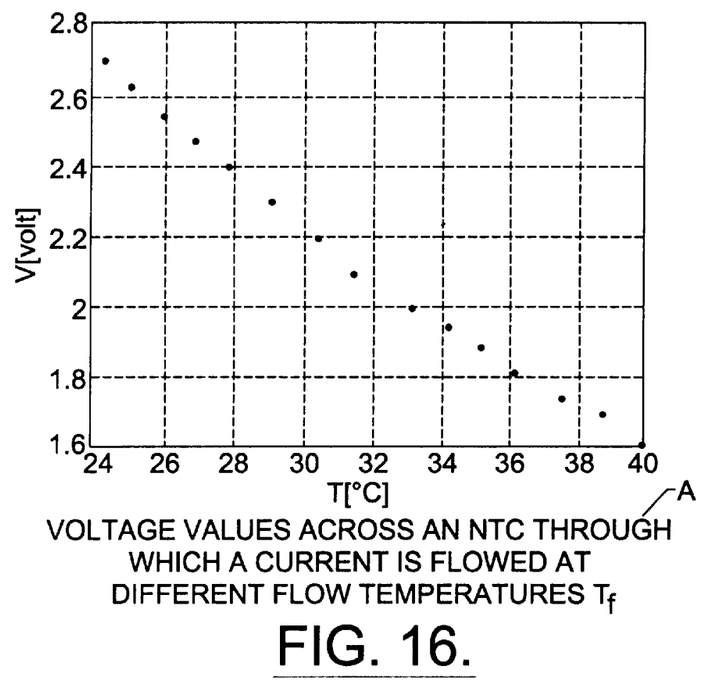
FIG. 16 is a plot of true voltages across a component of the sensor in FIG. 6 when a small current is passed therethrough at different flow temperatures.

FIG. 16 shows graphically the pattern of the voltage V across the NTC thermistor, as the flow maintains a constant velocity v while its temperature changes. It follows from FIGS. 15 and 16 that the voltage across this NTC thermistor is dependent solely on the temperature $T_f$ of the flow, since its dependence on the flow velocity is trivial.

Thus, once the thermistor 3 is dipped into the flow, the value of the voltage V across it can be safely regarded as the compensation quantity. It can also be noted that the voltage across the thermistor follows a curve which falls (approximately) linearly with temperature. This curve is similar to that observed for the hot-wire or heated probe NTC thermistor when swept by a constant velocity, varying temperature flow.

An aspect of the invention concerning the use of neural networks intended for processing the signals from the heated probes previously described will now be discussed with reference to the examples of FIGS. 17 to 20. Neural networks allow a fuzzy logic function to be obtained which will produce the measurement sought from predetermined input values.

The signals of interest to this invention are the individual voltages across the two thermistors: a hot NTC thermistor and a cold NTC thermistor. As previously explained, the two measurable voltages across the cold and hot thermistors, respectively, are: the one ($V_{n2}$) a function of the flow velocity v and temperature $T_f$, and the other ($V_{n1}$) dependent on just the flow temperature.

Sixteen fuzzy sets are assumed to be associated with each of the voltages. The total number of fuzzy logic rules, and hence the number of fuzzy sets at the output, can be determined by the fuzzy identification method, and considering that there are sixteen fuzzy sets per IF part ($V_{n1}, V_{n2}$), this will be of 121 terms.

The method of fuzzy logic identification is known and described, for example, in an article "Neural Model and Fuzzy Control of the Temperature of an Oven" by M. Lo Presti, R. Poluzzi, GC. Rizzotto, First International Conference on Fuzzy Logic Systems, Development Tools and Applications, San Francisco, Calif., Jul. 20–22, 1993.

Figure 17:
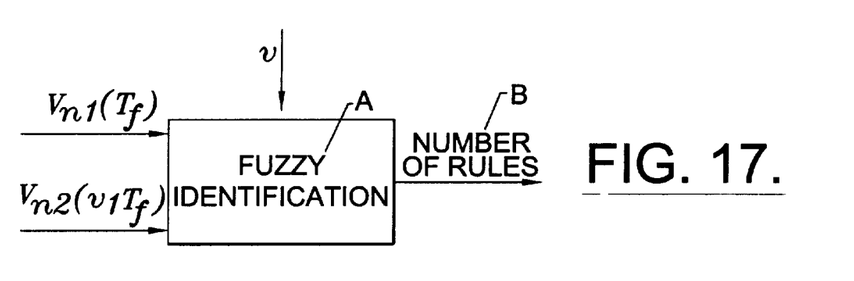
FIGS. 17 and 18 show respective block diagrams of a fuzzy logic architectures employed in the meter and the method of this invention.

Once the structure of the rule is established, the values of the membership functions of the THEN and IF parts can be determined by means of neuro-fuzzy networks. FIG. 17 shows schematically an identification block operated on fuzzy logic and adapted to identify the fuzzy rules involved in the measuring method of this invention.

Figure 18:
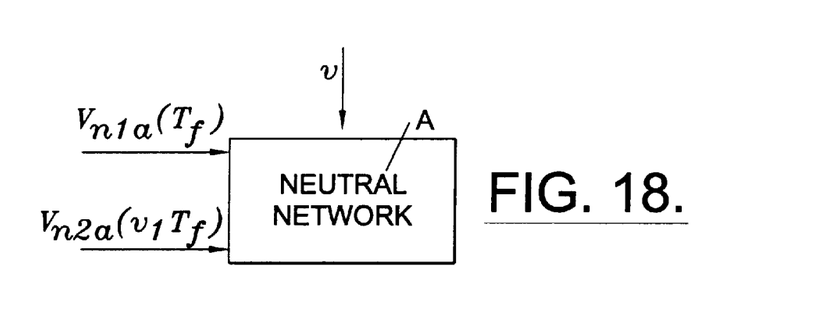

A neural network depicted schematically in the block of FIG. 18 is arranged to serve as a processing architecture for the fuzzy rules. As is known, a neural network includes an initial training step which, in the instance on hand, is organized as a training pattern having a set of values, 4000 triads, which represent the values of the voltages $V_{n1a}$, $V_{n2a}$ across the cold and hot NTC thermistors.

The training voltage values are set for predetermined conditions of flow velocity v and temperature $T_f$. The true flow values are also measured by means of an anemometer at the aforesaid predetermined conditions of velocity and temperature.

After the neural network is fully trained, the network inputs are applied approximately 12,000 pairs of voltage values of the two voltages $V_{n1a}$ and $V_{n2a}$. Such a large number of values concerns different values from those used during the training step and corresponding to all flow velocity and temperature conditions that could be impressed to obtain the value v at the output.

Figure 19:
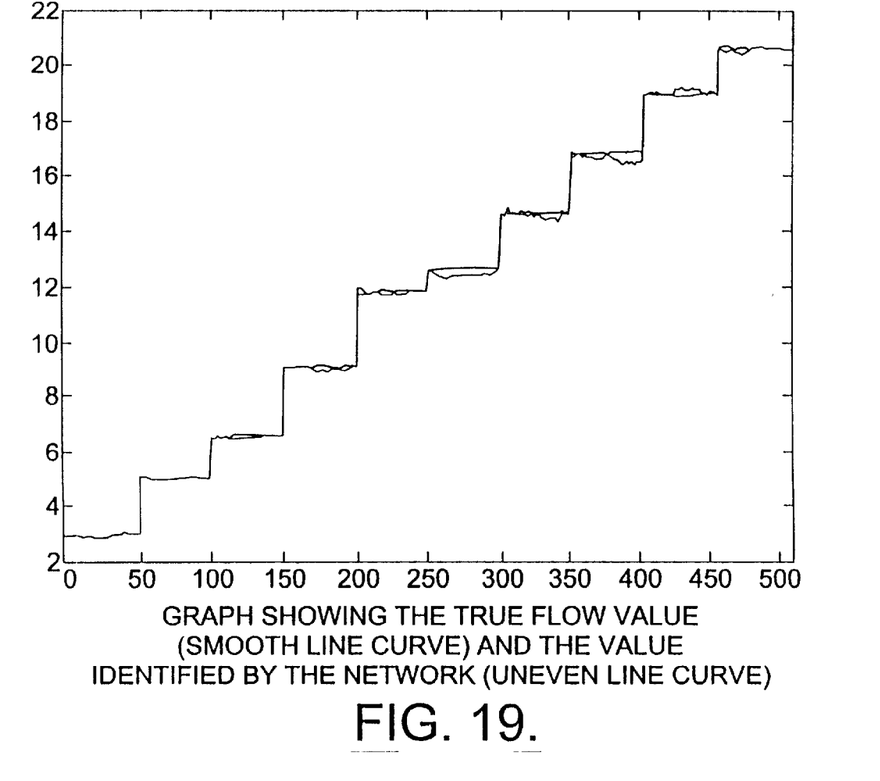
FIG. 19 is a comparative graph of the results of fuzzy logic processing through the blocks of FIGS. 17 and 18.
Figure 20:
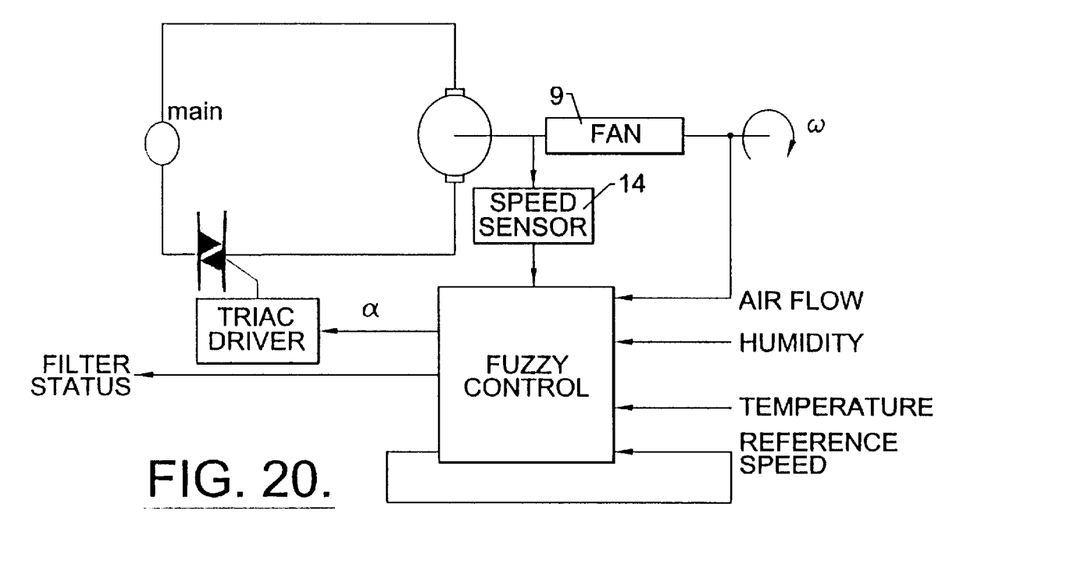
FIG. 20 is a schematic view of a suction hood incorporating a meter according to this invention.

By plotting on the same curve, as shown in FIG. 19, the two flow measurements, namely the true flow value v as read on the anemometer, and that $v_s$ determined by the neural network, once the voltage values $V_{n1}$ and $V_{n2}$ are presented at its input under the different flow conditions, a typical step pattern is obtained. It follows from this graph that the meter of this invention can measure the fluid flow with great accuracy. Thus, the flowmeter proposed by this invention can be put in the same class as heated probe sensors, because it is based on the same principle, but uses inexpensive sensors issuing information which is processed by a fuzzy mathematical model.

From measurements of the temperatures of the fluid whose velocity is to be acquired and of a heated body at a temperature above that of the fluid flowing past it, the desired measurement can be obtained. Also, the use of neural network and fuzzy logic methods yields a system which is unaffected by noise from the cheap sensors. The heated body at a "high" temperature (heated probe) may be a live resistor whose temperature is picked up by an NTC thermistor or heated NTC thermistor through a suitable current generator.

Dedicated electronic components for fuzzy rule processing allow the system inputs to be controlled with adequate response times for a measuring instrument. The use of the neuro-fuzzy method provides measurements of the fluid velocity, i.e. of its flow rate, through constant cross-section conduits, with excellent accuracy. Furthermore, the system is insensitive to noise, and especially to variations in the fluid temperature.

That which is claimed is:

1. A fluid flow meter comprising:
    a heated probe sensor of predetermined electrical resistance dipped into or swept by a fluid stream having a velocity, said heated probe sensor for converting each flow velocity value to a first voltage value;
    a cold probe sensor of predetermined electrical resistance dipped into or swept by the fluid stream having the velocity, said cold probe sensor for converting each flow velocity value to a second voltage value; and
    a processor operated on fuzzy logic and connected to said heated and cold probe sensors, said processor determining the velocity of the fluid stream based upon respective first and second sets of membership functions for the first and second voltage values;
    said processor comprising a neural network trained to calculate the velocity of the fluid stream based upon first and second voltage values.

2. A meter according to claim 1, wherein at least one of said heated and cold probe sensors comprises a thermistor.

3. A meter according to claim 1, wherein at least one of said heated and cold probe sensors comprises an NTC thermistor.

4. A meter according to claim 3, further comprising a current generator powering said NTC thermistor of said heated probe sensor.

5. A fluid flow meter comprising:
    a heated probe sensor of predetermined electrical resistance dipped into or swept by a fluid stream having a velocity, said heated probe sensor comprising an NTC thermistor for converting each flow velocity value to a first voltage value;
    a cold probe sensor of predetermined electrical resistance dipped into or swept by the fluid stream having the velocity, said cold probe sensor for converting each flow velocity value to a second voltage value; and
    a processor operated on fuzzy logic and connected to said heated and cold probe sensors, said processor determining the velocity of the fluid stream based upon respective first and second sets of membership functions for the first and second voltage values;
    said processor comprising a neural network trained to calculate the velocity of the fluid stream based upon first and second voltage values.

6. A meter according to claim 5, further comprising a current generator powering said NTC thermistor of said heated probe sensor.

7. A suction hood comprising:
    a fan for generating a fluid stream; and
    a fluid flow meter comprising
        a heated probe sensor of predetermined electrical resistance dipped into or swept by the fluid stream generated by said fan, said heated probe sensor for converting each flow velocity value to a first voltage value,
        a cold probe sensor of predetermined electrical resistance dipped into or swept by the fluid stream generated by said fan, said cold probe sensor for converting each flow velocity value to a second voltage value, and
    a processor operated on fuzzy logic and connected to said heated and cold probe sensors, said processor determining the velocity of the fluid stream based upon respective first and second sets of membership functions for the first and second voltage values;
    said processor comprising a neural network trained to calculate the velocity of the fluid stream based upon first and second voltage values.

8. A suction hood according to claim 7, wherein at least one of said heated and cold probe sensors comprises a thermistor.

9. A suction hood according to claim 7, wherein at least one of said heated and cold probe sensors comprises an NTC thermistor.

10. A suction hood according to claim 9, further comprising a current generator powering said NTC thermistor of said heated probe sensor.

11. A method of measuring a fluid flow comprising the steps of:
    positioning a heated probe sensor of predetermined electrical resistance to be swept by a fluid stream having a velocity to convert each flow velocity value to a first voltage value;

positioning a cold probe sensor of predetermined electrical resistance to be swept by the fluid stream having the velocity to convert each flow velocity value to a second voltage value; and producing each flow measurement from a processor operated on fuzzy logic and connected to said heated and cold probe sensors, the processor determining the velocity of the fluid stream based upon respective first and second sets of membership functions for the first and second voltage values;

the processor comprising a neural network trained to calculate the velocity of the fluid stream based upon first and second voltage values.

12. A method according to claim 11, wherein the steps of positioning the heated and cold probe sensors comprises positioning a respective NTC thermistor.

13. A method according to claim 11, further comprising the step of providing a fan to generate a fluid stream for a suction hood, and wherein the steps of positioning the heated and cold probe sensors comprises positioning same in the fluid stream generated by the fan of the suction hood.

* * * * *